United States Patent [19]

Ohshita et al.

[11] 4,363,890

[45] Dec. 14, 1982

[54] PROCESS FOR PRODUCING FLAME RETARDANT POLYAMIDE MOLDING RESIN CONTAINING MELAMINE CYANURATE

[75] Inventors: Hiroshi Ohshita; Tadao Tsutsumi, both of Nagoya, Japan

[73] Assignee: Toray Industries, Inc., Tokyo, Japan

[21] Appl. No.: 240,576

[22] Filed: Mar. 9, 1981

Related U.S. Application Data

[62] Division of Ser. No. 138,690, Apr. 9, 1980.

[30] Foreign Application Priority Data

| Apr. 12, 1979 | [JP] | Japan | 54-44616 |
| Apr. 12, 1979 | [JP] | Japan | 54-44617 |
| Apr. 12, 1979 | [JP] | Japan | 54-44618 |
| Apr. 12, 1979 | [JP] | Japan | 54-170338 |

[51] Int. Cl.$^3$ .......................... C08K 5/04; C08K 5/34; C08L 77/00

[52] U.S. Cl. .................................. 524/101; 524/100; 524/606; 528/314; 528/336

[58] Field of Search ................ 528/314, 336; 524/101, 524/606, 100

[56] References Cited

U.S. PATENT DOCUMENTS

| 4,001,177 | 1/1977 | Tsutsumi et al. | 260/45.8 NT |
| 4,180,496 | 12/1979 | Yanagimoto et al. | 260/45.8 NT |
| 4,298,518 | 11/1981 | Ohmura et al. | 260/45.8 NT |

*Primary Examiner*—Harold D. Anderson
*Attorney, Agent, or Firm*—Austin R. Miller

[57] ABSTRACT

A process for producing flame retardant polyamide molding resin containing melamine cyanurate which is formed from melamine and cyanuric acid in the molten polyamide and which has a fine crystallite size of less than 250 Å. The polyamide molding resin produced by this process provides shaped articles having excellent mechanical properties as well as flame retardant properties without blooming.

4 Claims, 4 Drawing Figures

PROCESS FOR PRODUCING FLAME RETARDANT POLYAMIDE MOLDING RESIN CONTAINING MELAMINE CYANURATE

This is a division of application Ser. No. 138,690 filed Apr. 9, 1980.

1. Field of the Invention

The present invention relates to a process for producing flame retardant polyamide molding resin. More specifically, the present invention relates to a process for producing a polyamide molding resin having excellent mechanical properties and molding processability as well as flame retardant properties.

2. Description of the Prior Art

Polyamide molding resins are used in a wide range of applications because of their excellent mechanical strength. However, it has been recently required that they have a high level of flame retardancy especially for electric or electronic use, and various kinds of flame retarding agents have been proposed.

Melamine cyanurate, one of the flame retardant agents for polyamides, is very excellent, so far as the so-called blooming phenomenon is concerned (Japanese Patent Publication Kokai No. 53-31759). That is, melamine cyanurate blended with a polyamide does not bleed out on the surface of the molded article prepared therefrom because of its limited tendency to sublime.

Melamine cyanurate, however, has some disadvantages when used as a flame retardant agent. One disadvantage is the relatively great difficulty in dispersing it in the polyamide. A uniform dispersion of the flame retarding agent is the matrix resin is highly desirable for imparting to the resin excellent flame retardant properties. At the same time, a non-uniform dispersion of melamine cyanurate downgrades the mechanical properties of the entire molding resin.

Another disadvantage of melamine cyanurate is its high cost in comparison with melamine or cyanuric acid. Melamine cyanurate is usually prepared by reacting an equimolar amount of melamine and cyanuric acid in a large amount of water at a temperature of 80° to 90° C. The precipitate of melamine cyanurate thus obtained is separated from the water by filtration, dried and crushed to a fine powder. Such a troublesome process naturally results in the high cost of the melamine cyanurate.

SUMMARY OF THE INVENTION

It is an object of the present invention to provide a process for producing improved polyamide molding resins containing melamine cyanurate as a flame retardant agent and having excellent mechanical properties as well as excellent flame retarding characteristics.

Another object of the present invention is to provide a cost saving process for preparing the improved flame retardant polyamide molding resin directly from melamine, cyanuric acid and a polyamide.

Still other objects of the present invention will be apparent from the description in the accompanying specification.

We now have found that melamine cyanurate can be formed in molten polyamide resins from melamine and cyanuric acid at a conversion of substantially 100%. Melamine cyanurate thus prepared has an extraordinarily fine crystallite size which can be determined by x-ray diffraction analysis, and also has fairly excellent dispersion properties in the polyamide.

The present invention provides a process for producing a flame retardant polyamide molding resin which comprises a polyamide and melamine cyanurate finely dispersed in the polyamide matrix, said melamine cyanurate being formed from an equimolar amount of melamine and cyanuric acid in the molten polyamide at a conversion of substantially 100%, and said melamine cyanurate having an average crystallite size (L) of less than 250 Å, calculated by the following formula, $$L = \frac{\kappa \cdot \lambda}{\beta_o \cdot \cos \theta}$$

wherein,

L = average crystallite size of melamine cyanurate measured along the direction perpendicular to the lattice planes whose spacing is 3.17 Å, $\theta$ = diffraction of the lattice planes whose spacing is 3.17 Å, $\beta_o$ = half width of the diffraction peak corresponding to the lattice planes whose spacing is 3.17 Å (unit; radian), $\kappa$ = constant (1.0)

$\lambda$ = wavelength of the employed x-ray (Å).

DETAILED DESCRIPTION OF THE PREFERRED EMBODIMENTS

Melamine cyanurate formed by the process of this invention in molten polyamide from melamine and cyanuric acid has a remarkably small crystallite size and is excellently dispersed in the polyamide.

The crystallite size L can be less than 250 Å, preferably less than 200 Å. The crystallite size L is calculated by the following formula (Scherrer's equation), $$L = \frac{\kappa \cdot \lambda}{\beta_o \cdot \cos \theta}$$

wherein L, $\beta_o$, $\theta$, $\kappa$ and $\lambda$ are the same as explained above, and can be measured by the method described below.

The intensity of the x-ray reflected by the test piece of the polyamide molding resin to diffraction angle (2$\theta$) is measured continuously by x-ray diffractometer, and the half width ($\beta_o$) of the diffraction peak corresponding to the lattice spacing of 3.17 Å is evaluated. Then the crystallite size (L) is calculated from the above Scherrer's equation. The conditions for the above described measurement are as follows:

test sepecimens: injecion molded plate having a thickness of 1/16",
x-ray source: Cu, K$\alpha$, wavelength ($\lambda$) = 1.542 Å,
x-ray tube voltage: 35 kV
x-ray tube current: 15 mA
slit system:
    divergence slit ½°,
    receiving slit 0.3 mm,
    scattering slit ½°.

With the conditions as described above, the diffraction peak corresponding to the lattice spacing 3.17 A appears at 2$\theta$ = 28.15°.

Figure 1:
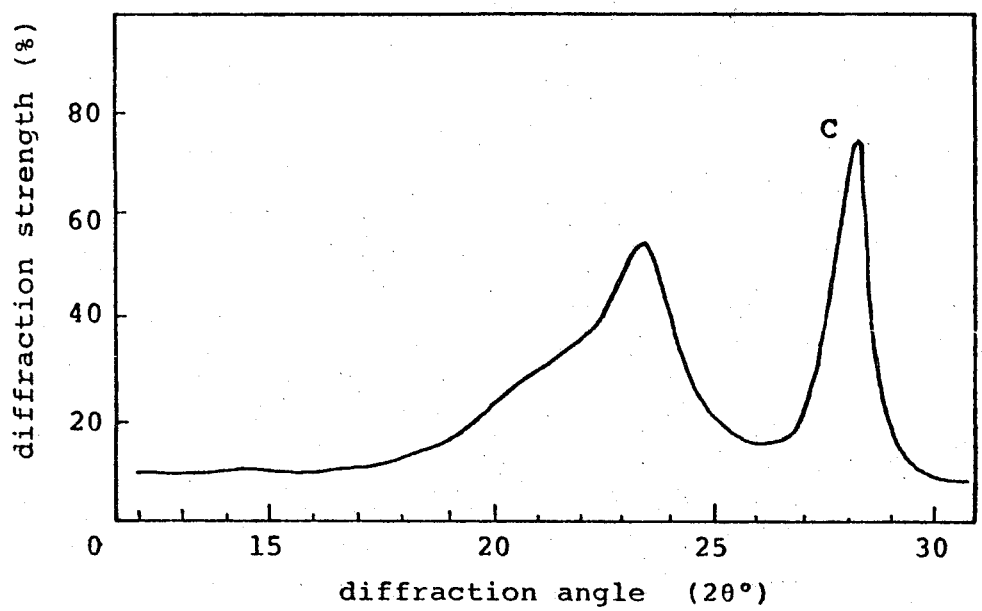
Figure 3:
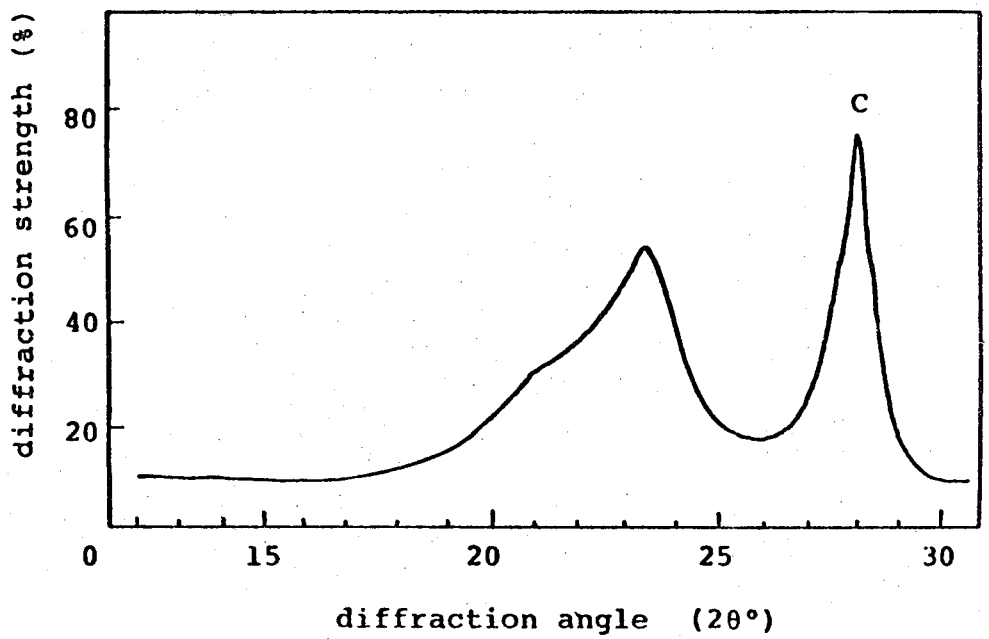

Referring to the drawings FIGS. 1 and 3 are x-ray diffraction spectra of the polyamide molding resin. The peak C at 2$\theta$ = 28.15 Å shows that melamine cyanurate is formed from melamine and cyanuric acid. No peaks suggesting the existence of remaining melamine and cyanuric acid are observed.

Figure 2:
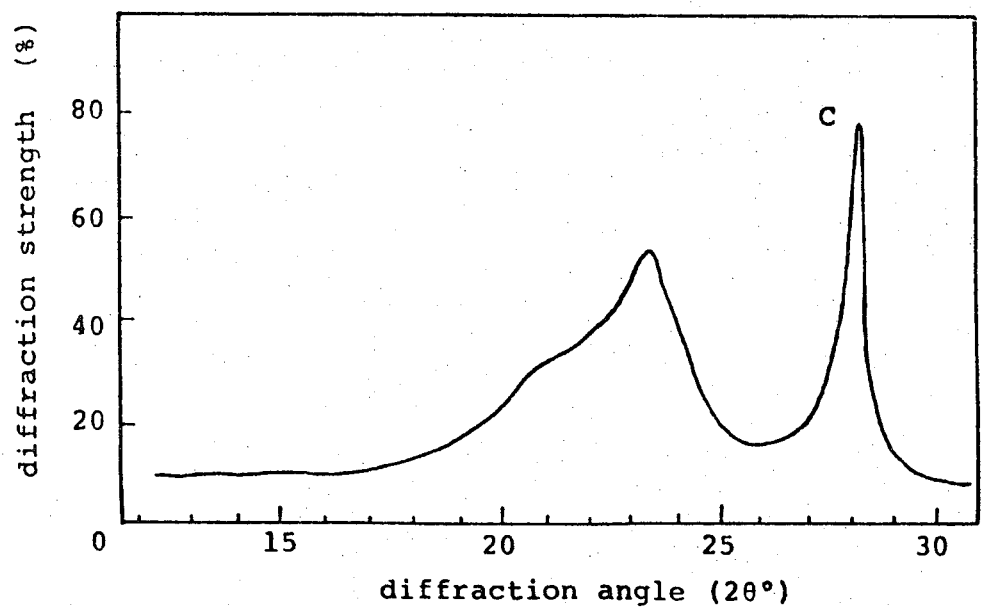

FIG. 2 is an x-ray diffraction spectrum of a polyamide molding resin prepared by melt-blending nylon 6 and melamine cyanurate previously prepared in a conventional method and commercially available. The peak at $2\theta = 28.15$ Å is far sharper than that in FIGS. 1 and 3. This fact teaches that the melamine cyanurate formed in the molten polyamide has a considerably smaller crystallite size than the ordinary melamine cyanurate.

The commercially available melamine cyanurate is usually prepared from melamine and cyanuric acid in a large amount of water, and has a larger crystallite size, usually more than 300 Å.

As mentioned above, it is not easy to bring about a uniform dispersion of the same in polyamide.

Figure 4:
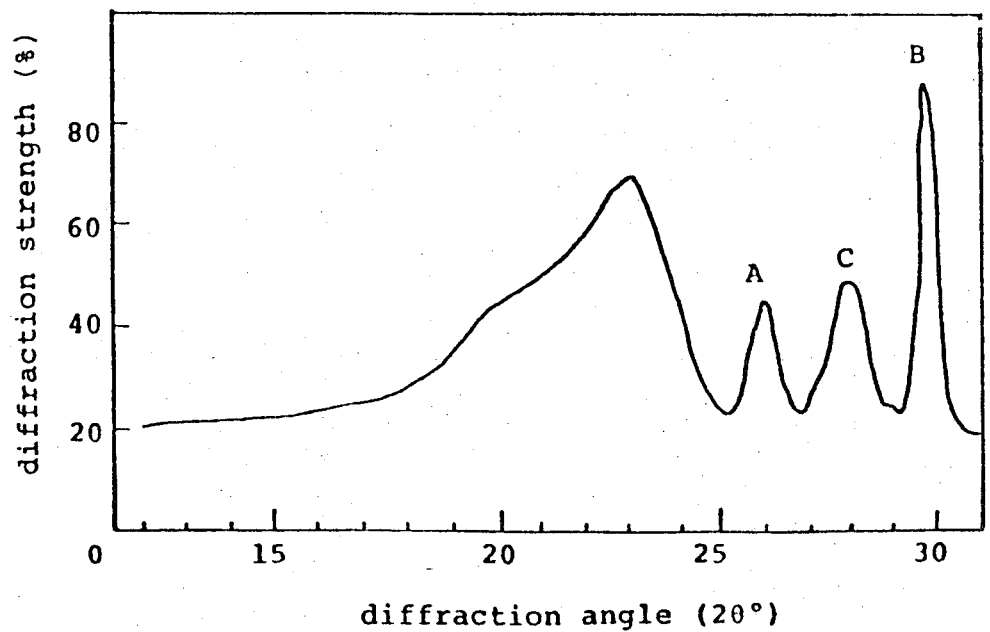

FIG. 4 is an x-ray diffraction spectrum of a polyamide molding resin prepared by melt-blending in the extruder a dry blend of melamine, cyanuric acid and polyamide pellets. The peaks A and C correspond to the characteristic diffraction angle of melamine and cyanuric acid crystals respectively. In this case the complex formation (melamine cyanurate is a charge-transfer type complex of melamine and cyanuric acid) is not complete and a substantial amount of melamine and cyanuric acid remains in the polyamide molding resin.

The amount of melamine cyanurate contained in the polyamide molding resin of the present invention may be in the range from 1 to 30%, preferably 3 to 15% by weight based on the polyamide. The amount may be determined according to the desired level of flame retardant properties to be imparted to the polyamide molding resin. An excessive amount of melamine cyanurate tends to downgrade the mechanical properties of the polyamide molding resin. For this reason the use of more than 30% by weight of melamine cyanurate is not recommended.

The polyamide molding resin of the present invention is characterized in that a relatively small amount of melamine cyanurate can impart a higher level of flame retardancy to the polyamide resin in comparison with the use of melamine cyanurate previously prepared and having a larger crystallite size. For example, by using approximately 5% by weight of melamine cyanurate according to the present invention the polyamide molding resin can achieve a flame-retardancy of V-0 under UL-94.

Melamine cyanurate contained in the flame retardant polyamide molding resin of the present invention is formed from melamine and cyanuric acid in the molten polyamide. The conversion in the complex formation should be substantially complete. At the same time the amount of melamine and cyanuric acid added to the polyamide should be substantially equimolar. When a substantial amount of either melamine or cyanuric acid remains unreacted in the polyamide molding resin, a blooming phenomenon tends to take place on the surface of molded articles prepared therefrom.

For example, in one of the most usual blending methods, wherein a dry blend of equimolar amounts of pulverized melamine and cyanuric acid with dry pellets of polyamide is fed to an extruder and thoroughly melt-blended therein, the conversion of the complex forming reaction can not be expected to reach a level of as high as 100%.

Preferable methods to attain substantially complete conversion of melamine and cyanuric acid to melamine cyanurate are as follows.

(1) In the first method melamine and cyanuric acid are separately blended with molten polyamide, and then both polyamide blends are further melt-blended with each other in such an amount that the melamine and cyanuric acid become equimolar in the ultimate blend. In this case melt-blending means a blending at a temperature high enough to maintain the polyamide in a molten state. Melamine and cyanuric acid are usually blended in the solid state. Both polyamide blends, containing melamine and cyanuric acid respectively, may be once formed into pellets, and these two different pellets may be again melt-blended in a repelletizing extruder or other molding extruder such as an injection molder. In other embodiments, both streams of molten polyamide, containing melamine and cyanuric acid respectively, may directly be mixed through a static mixing apparatus for fluids.

The temperature at which the above melt-blending is carried out may be 5° to 80° C. higher than the melting point of polyamide.

(2) In an alternative method, a polyamide composition containing either one component of melamine or cyanuric acid is previously prepared by a conventional melt-blending method. To this polyamide composition another component selected from melamine and cyanuric acid is added and thoroughly melt-blended. At this time, the amount of melamine and cyanuric acid should be adjusted so as to become equimolar, in order to attain a conversion as high as possible. Of course, the order of adding melamine and cyanuric acid is not restricted.

The previously prepared polyamide composition may be once pelletized and then again blended with another component. In other embodiments, the second component may be added to the melt of the previously prepared blend without forming the same into first pellets. In the latter embodiments, an extruder installed with two feed inlets can be advantageously used.

In this method, the melt-blending of polyamide with both components, melamine and cyanuric acid, is carried out at a temperature of 5° to 80° C. higher than the melting point of the polyamide.

The master pellet method can be adopted to this embodiment. Thus the master pellet containing a high content of either melamine or cyanuric acid may be blended with the other component selected from melamine and cyanuric acid and virgin pellets of polyamide.

(3) In a third method, polyamide is melt-blended with melamine and cyanuric acid in the presence of water. The amount of water may be 1 to 30%, preferably 3 to 20%, by weight based on the polyamide, and more preferably approximately equivalent to the total amount of melamine and cyanuric acid. When less than 1% by weight of water is used, enhancement of the conversion to the complex formation is not great enough to minimize the blooming phenomenon. When more than 30% by weight of water is used, water causes foaming in the molten polyamide during the melt-blending operation, and therefore it becomes impossible to operate the melt-blending procedure continuously.

In this method, the manner of adding melamine and cyanuric acid to the polyamide is not restricted. They can be previously mixed with each other and the mixture may be added to the polyamide together with water. Of course, the separate addition method as adopted in the above-described methods (1) and (2) can be employed in this method. The melt-blending methods are not restricted. Various conventional methods which can achieve the uniform blending of melamine and cyanuric acid in the polyamide may be employed.

The proper amount of water may be added to blends comprising dry pellets of polyamide, melamine and cyanuric acid. The wet pellets of polyamide, which are easily available from the oligomer extraction process and contain about 10% by weight of water, may be advantageously used in this embodiment.

The extruder used in this method may preferably be installed with a vent, from which steam originated in the melt-blending operation can be removed.

The reason water accelerates the formation of melamine cyanurate is not fully understood. However, it can be reasonably assumed that the existence of water in the melt-blends improves the solubility of melamine and cyanuric acid in the polyamide.

In this method no specific melt-blending conditions are required. The melt-blending temperature may be 5° to 80° C. higher than the melting point of the polyamide.

The polyamide resins of the present invention may be any conventional thermoplastic polyamide resins. For example, the polyamide resins 1 can be obtained by polymerizing lactams or aminocarboxylic acids having three or more carbon atoms. Alternatively, the polyamide resins can be obtained by polycondensation of diamines and dicarboxylic acids or derivatives thereof. That is, the polyamide resins include homopolymers and co-polymers of polyamides and mixtures thereof. Examples of the polyamide resins are homo-polyamides such as nylon 6, nylon 66, nylon 4, nylon 8, nylon 11, nylon 12, nylon 69, nylon 610 and nylon 612 and co-polyamides such as nylon 6/66, nylon 6/12 and nylon 6/69.

The melamine used in preparing the polyamide molding resin of the present invention is not specifically restricted. The malamine powder commercially available for the production of melamine-formaldehyde resin may be used. The melamine powder may be purified by recrystallization from water or may be further finely pulverized. More preferably, melamine powders having an average diameter of less than 50 $\mu$ are used. The malamine may contain melamine derivatives such as acetoguanamine, ethylmelamine, benzo-guanamine and anmelin within ranges such that the advantages of the present invention are retained.

Cyanuric acid used in preparing the polyamide molding resin of the present invention may preferably have a average diameter of less than 50 $\mu$. The term "cyanuric acid" means both cyanuric and isocyanuric acid inclusively.

The polyamide molding resin of the present invention may contain dyes, pigments, fillers, fibrous reinforcing fillers, heat-resisting agents, weather-proofing agents, plasticizers, lubricants, mold-release agents, nucleating agents and anti-static agents. Particularly, in order to increase the heat resistance of the composition of the present invention, copper-containing compounds which are effective for heat-stabilizing ordinary polyamide resins may be added. For example, inorganic salts such as copper iodide and copper sulfate and organic acid salts such as copper acetate and copper stearate may be used. The copper compounds mentioned above may be used together with an alkali metal or an alkaline earth metal. Hindered phenols and phosphite compounds may also be used as heat-stabilizing agents. As mold-release agents, higher fatty acids or their derivatives such as esters, amides and metal salts, paraffins and silicone oils may be used. As nucleating agents, talc, zeolite, clay and alumina etc., may be used. The anti-static agents used may be polyalkyleneglycol, sodium dodecylbenzensulfonate and so on.

The present invention will be illustrated in more detail by the following examples.

In these examples, the combustion test was carried out by measuring a combustion test piece of $5'' \times \frac{1}{2}'' \times 1/16''$ by Standard UL-94 (Underwriters Laboratories Inc. of U.S.A.) using vertical combustion.

The tensile strength and the Izod impact strength were measured by the methods of ASTM-D-638 and D-256 respectively.

Blooming was tested as follows. To 100 parts by weight of pellets of polyamide molding resin, 5 parts by weight of black master pellets M 100 B-1 produced by Toray Ind. Inc. are added and dry-blended. The blends are molded to form test pieces for UL-9 UL-94 combustion test. The test pieces are maintained at 40° C. in 95% RH for seven days, and thereafer are checked visually for any white blooming material bleed out onto the surface.

EXAMPLE 1

95 parts by weight of nylon 6 having a relative viscosity ($\eta_r$) of 2.40, which is determined in a solution of 1 g of the resin in 100 ml of 98% sulfuric acid at 25° C., and 5 parts by weight of melamine were uniformly mixed using a Henschell mixer. The mixture was fed into an extruder having an inside diameter of 30 m/m, melted and kneaded at a temperature of 250° C. The molten mixture was extruded to form a strand, and then cut into pellets. In a manner similar to that described above, using cyanuric acid instead of melamine, nylon 6 pellets containing 5% of cyanuric acid were prepared. (Then these two types of pellets were dried for 16 hours at a temperature of 80° C. by vacuum dryer).

50 parts each of the two types of pellets obtained above were dry-blended and fed into an extruder having a inside diameter of 30 m/m. The blend was melted and kneaded at a temperature of 250° C., extruded to form a strand, and cut to form pellets (A) containing 5% by weight of melamine cyanurate. Then, pellets (A) were molded into UL flame test specimens at a thickness of 1/16 inch and tensile and impact test specimens by a 3.5 oz. injection molding machine.

For the comparative test, 95 parts by weight of nylon 6, having a relative viscosity 2.40 and 5 parts by weight of melamine cyanurate, which was uniformly mixed by using a Henschell mixer, were fed into an extruder of 30 m/m, melted and kneaded at a temperature of 250° C. The molten blend was extruded in the form of a strand and cut to form pellets (B) containing 5% by weight of melamine cyanurate. The pellets (B) were molded to form test specimens in the same way described above.

The 1/16 UL test specimens obtained from pellets of (A) and (B) were subjected to x-ray diffraction analysis. FIGS. 1 and 2 are the x-ray diffraction spectra of test specimens prepared from pellets (A) and (B), respectively and clearly demonstrate that pellets (A) contain melamine cyanurate. Furthermore from L (Å) in Table 1, it can be easily seen that malamine cyanurate formed in molten polyamide has a smaller crystalline particle size than that of commercially available melamine cyanurate.

The crystalline size L was measured by the previously described method of x-ray diffraction analysis.

Then, each specimens was subjected to the UL-94 flammability test and JIS K-6810 tensile, impact tests. The evaluation of flammability was conducted, using 5 specimens for each sample, including the disorder of flammability behaviour. The numbers cited in the column of evaluation of flame test in Table 1 show the flaming time in seconds and the mark inside the () represents whether the cotton below the test specimen is ignited or not. o shows no ignition of cotton, and x shows ignition of cotton.

These test results are summarized in Table 1.

From the results of Table 1, it is clearly understood that the polyamide molding resins produced by the process of the present invention, in which melamine cyanurate having a smaller crystalline particle size is dispersed, have improved flame retardant properties and exhibit excellent mechanical properties.

TABLE 1

| Specimen | L (Å) | Evaluation of Flammability | | | | | Tensile Strength (kg/cm$^2$) | Notched Izod Impact Strength (kg cm/cm) |
|---|---|---|---|---|---|---|---|---|
| A (Example 1) | 142 | 0 (o) | 0 (o) | 0 (o) | 0 (o) | 0 (o) | 820 | 4.5 |
| B (Comparative test) | 550 | 1 (x) | 0 (o) | 5 (x) | 2 (o) | 0 (o) | 700 | 3.0 |

EXAMPLE 2

100 parts by weight of nylon 6, having a relative viscosity of 2.35 and 10 parts by weight of melamine were uniformly mixed using a Henschell mixer, and then fed into an extruder, having a diameter of 30 m/m, melted and kneaded at a temperature of 240° C. to form nylon 6 pellets containing melamine.

By the same method, nylon 6 pellets containing cyanuric acid were prepared from 100 parts by weight of nylon 6 and 10 parts by weight of cyanuric acid. After drying at 80° C. in vacuum the dryer, two kinds of pellets obtained above were dry-blended mixing, 50 parts by weight of each and fed to an extruder having a diameter of 30 m/m, melted and kneaded. The molten blend was formed into white pellets (C) having a length of 3.0 m/m and a diameter of 3.0 m/m.

By the same method used in Example 1, the pellets were molded into a number of test specimens, and subjected to the tests. The results are summarized in Table 2.

For the comparative tests, 100 parts by weight of nylon 6 were blended with 10 parts by weight of an equimolar dry-blended mixture of melamine and cyanuric acid using a Henschell mixer, then fed to an extruder having a diameter of 30 m/m. The blend was melted and kneaded to form pellets (D). The pellets (D) were shaped into test specimens and subjected to the tests in the same manner as described above. As can be seen from the data shown in Table 2, the flame retardant and bleed out characteristics of the polyamide molding resin were unsatisfactory.

From the results of Table 2, it is clear that the polyamide molding resin of this invention has satisfactory flame retarding and bleed out characteristics.

Further investigation by x-ray diffraction analysis was carried on pellets (C) and (D). The x-ray diffraction opectra are shown in FIG. 3 for pellets (C) and FIG. 4 for pellets (D) respectively. FIG. 4 shows that pellets (D) still contain melamine (peak A) and cyanuric acid (peak B), whereas pellets (C) contain only melamine cyanurate with melamine and cyanuric acid being completely converted to melamine cyanurate.

TABLE 2

| Specimen | L (Å) | UL-94 Flame Class | Bleed out of Flame Retardant | Tensile Strength (kg/cm$^2$) |
|---|---|---|---|---|
| C (this invention) | 150 | V-0 | o | 800 |
| D (comparative test) | 150 | V-2 | x | 775 |

EXAMPLE 3

Melamine/nylon 6 and cyanuric acid/nylon 6 pellets as prepared in Example 2 and virgin pellets of nylon 6 as used in Example 2, were dry-blended to produce the ultimate compositions shown in Table 3. The compositions thus obtained were tested by the same method as used in Example 2. The results are shown in Table 3.

TABLE 3

| | The amount of flame retardant (parts by weight per 100 parts of nylon 6) | | | | |
|---|---|---|---|---|---|
| No. | Melamine | Cyanuric acid | L (Å) | UL-94 flame Class | Bleed out of flame retardant | Tensile Strength (kg/cm$^2$) |
| 1 | 1 | 1 | 140 | V-2 | 0 | 735 |
| 2 | 2 | 2 | 145 | V-0 | 0 | 750 |
| 3 | 3 | 3 | 145 | V-0 | 0 | 770 |
| 4 | 4 | 4 | 150 | V-0 | 0 | 770 |

EXAMPLE 4

Two extruders having a diameter of 30 m/m were installed so that the molten streams of nylon 6 coming out from the head of each extruder were joined together in a static mixer tube (TORAY "High Mixer"), thoroughly melt-blended therethrough and extruded from the outlet of the mixer. To each hopper of the extruders in this equipment, the dry blends of melamine powder with nylon 6 pellets (15/85% by weight) and cyanuric acid powder with nylon 6 pellets (15/85% by weight) were fed respectively, and then melted and kneaded at a temperature of 250° C. The thoroughly blended nylon composition was extruded from the static mixer as a gut, which was cut into pellets.

Test specimens were prepared from the pellets. The flame retardant properties, of the blend were evaluated as UL-94 V-0, and no bleed out phenomenon was observed. This blend was found to have excellent mechanical properties. Tensile strength was 790 kg/cm$^2$. The crystal particle size of melamine cyanurate dispersed in the nylon 6 was 100 Å.

EXAMPLE 5

100 parts by weight of nylon 6, having a relative viscosity of 2.35 and 5 parts by weight of melamine were fed to an extruder having a diameter of 30 m/m, melted and kneaded at 245° C. and shaped into pellets. 4.76 parts of cyanuric acid were added to 100 parts of the above obtained pellets, then mixed and fed to an extruder having an inside diameter of 30 m/m, and shaped to cylindrical pellets (E) of 3.0 m/m in diameter and 3.0 m/m in length.

Other pellets (F) were obtained by a similar process, adding melamine to previously prepared nylon/cyanuric acid blends.

For the comparative test, 100 parts of nylon 6 and 10 parts of a pre-mixed equimolar mixture of melamine and cyanuric acid were uniformly blended using a Henschell-Mixer, then fed to an extruder, having a diameter of 30 m/m and, were melted and kneaded to form pellets (G) of 3.0 m/m in diameter, 3.0 m/m in length.

These pellets (E)–(G) were molded to form test specimens and the specimens were subjected to the tests for the measurement of L, flammability and tensile strength. The results are shown in Table 4.

Further, the results of x-ray diffraction analysis of the test specimens of (E), (F) shows only the peak of melamine cyanurate and no peak of melamine and cyanuric acid.

TABLE 4

| Source of Pellet | L (Å) | UL-94 Flame Class | Bleed out of flame retardant | Tensile Strength (kg/cm²) |
|---|---|---|---|---|
| (E) | 150 | V-0 | o | 810 |
| (F) | 155 | V-0 | o | 790 |
| (G) | 155 | V-0 | x | 760 |

EXAMPLE 6

60 parts of nylon 6 having a relative viscosity ($n_r$) of 2.70, and 40 parts of melamine were uniformly blended using a Henschell mixer, fed to an extruder having a diameter of 60 m/m, and thoroughly melt-blended at a temperature of b 260° C. This mixture was then shaped into nylon 6 master pellets containing 40% melamine.

The above nylon 6 master pellets containing melamine, cyanuric acid and pellets of nylon 6 having $n_r$ of 2.35 were dry-blended to produce the final compositions shown in Table 5 using a V-type blender. The mixture was fed to a vent type extruder, melt-blended at a temperature of 260° C. and then pelletized to form white pellets containing melamine cyanurate. These pellets were molded to form a number of test specimens and subjected to the measurement of (L), flammability and mechanical properties by methods similar to Example 1.

For the comparative tests, nylon 6 master pellets containing 40% melamine cyanurate were prepared from nylon 6 having $n_r$ of 2.70 and melamine cyanurate powder. The master pellets were diluted by melt-blending with nylon 6 pellets and the final blends were pelletized. The blends thus obtained were subjected to testing by the same method. The results were shown in Table 5.

Further, from the x-ray diffraction analysis of the test specimens of 6-1 through 6-6, no peaks of melamine or cyanuric acid were observed and only the peak of melamine cyanurate was observed.

TABLE 5

| | The amount of blend (%) | | L (Å) | Flammability | | | | | Tensile Strength (kg/cm²) |
|---|---|---|---|---|---|---|---|---|---|
| | Melamine | cyanuric acid | | | | | | | |
| example 6-1 | 2 | 2 | 140 | 1 (o) | 0 (o) | 1 (o) | 0 (o) | 1 (o) | 840 |
| example 6-2 | 3 | 3 | 140 | 0 (o) | 0 (o) | 0 (o) | 0 (o) | 0 (o) | 850 |
| example 6-3 | 5 | 5 | 150 | 0 (o) | 0 (o) | 0 (o) | 0 (o) | 0 (o) | 870 |
| example 6-4 | 7 | 7 | 150 | 0 (o) | 0 (o) | 0 (o) | 0 (o) | 0 (o) | 850 |
| example 6-5 | 10 | 10 | 170 | 0 (o) | 0 (o) | 0 (o) | 0 (o) | 0 (o) | 880 |
| example 6-6 | 15 | 15 | 190 | 0 (o) | 0 (o) | 0 (o) | 0 (o) | 0 (o) | 890 |
| Comparative example 6-1 | melamine cyanurate 4 | | 300 | 3 (x) | 1 (x) | 0 (x) | 3 (o) | 0 (x) | 810 |
| comparative example 6-2 | 6 | | 300 | 2 (x) | 0 (o) | 0 (o) | 2 (x) | 2 (o) | 820 |
| comparative example 6-3 | 10 | | 320 | 2 (o) | 2 (o) | 0 (o) | 1 (o) | 1 (o) | 760 |
| comparative example 6-4 | 14 | | 350 | 0 (o) | 0 (o) | 0 (o) | 0 (o) | 0 (o) | 630 |
| comparative example 6-5 | 20 | | 400 | 0 (o) | 0 (o) | 0 (o) | 0 (o) | 0 (o) | 520 |

EXAMPLE 7

A vent type screw extruder having a screw diameter of 85 m/m and a cylinder length of 3.0 m, equipped with two feeding inlets is used. The first inlet resides at 2.5 m, and the second at 1 m from the exit of the extruder. Nylon 6 pellets and melamine were fed to the first feeding inlet and cyanuric acid was fed to the second feeding inlet continuously at a rate as shown in Table 6.

The melt blend was extruded from the exit at a temperature of a 260° C. in the form of strand, and the strand was cooled in water and cut to form pellets 2.5 m/m in diameter and 2.5 m/m in length. The feeding machines used were a vibrating feeder (SHINO DENKI) and a Funken Auto Feeder (Funken) respectively.

The pellets were molded into test specimens and subjected to tests in a manner similar to that of Example 1. The results are summarized in Table 6.

No. 5 and 6 in the Table show comparative examples using only nylon 6 at the first feeding inlet, and an equimolar mixture of melamine and cyanuric acid at the second feeding inlet.

TABLE 6

| No. | Feeding rate (kg/hr) | | | L (Å) | UL-94 flame class | Bleed out of flame retardant | Mechanical Tensile Strength (kg/cm) |
|---|---|---|---|---|---|---|---|
| | Inlet 1 | Inlet 2 | | | | | |
| | Nylon 6 | Melamine | Cyanuric acid | | | | |
| 1 | 200 | 2 | 2 | 140 | V-2 | o | 700 |
| 2 | 200 | 15 | 15 | 140 | V-0 | o | 820 |
| 3 | 200 | 25 | 25 | 140 | V-0 | o | 800 |
| 4 | 200 | 30 | 30 | 140 | V-0 | o | 760 |
| 5 | 200 | — | 6* | 150 | V-2 | x | 710 |
| 6 | 200 | — | 10* | 150 | V-0 | x | 770 |

EXAMPLE 8

100 parts by weight (at dry base) of wet pellets of nylon 6, polymerized by a conventional method and extracted with water to remove oligomers, were prepared. The nylon 6 had a relative viscosity of 2.20 as determined by JIS-K-6310 and a water content of 10.3%. 100 parts by weight (at dry base) of the wet pellets were uniformly blended with an equimolar mixture of melamine and cyanuric acid powder using a Henschell mixer in the amounts shown in Table 7. The blends were fed into a vent-type extruder having an inside diameter of 65 m/m, then melt-blended at a temperature of 250° C. The melt blend was extruded in the form of a gut, which was cooled in a water bath and cut to form pellets. This melt-blend operation was easily and smoothly carried out.

The above-described pellets were dried in a vacuum at a temperature of 90° C. for 15 hours, then molded to form a number of test specimens at a temperature of 245° C. and subjected to testing.

For comparative examples, the above-mentioned nylon 6 wet pellets were dried to a content of below 0.1% of water. Then for the comparative tests, the above mentioned melt blending operation with a mixture of melamine and cyanuric acid was conducted in the absence of water, using the dried pellets of nylon 6.

The test results were shown in Table 7.

From Table 7, it is clear that the polyamide melt-blended with the equimolar mixture of melamine and cyanuric acid in the presence of water gives an improved flame retardant polyamide with excellent flame retardant and bleed out characteristics.

By x-ray diffraction analysis of the UL-test specimen of 1/16 inch thickness of samples 1 to 3, it was confirmed that the melamine and cyanuric acid were completely converted to melamine cyanurate, whereas the samples of the comparative example were found to contain melamine and cyanuric acid together with melamine cyanurate.

TABLE 7

| No. | Nylon 6 | The amount of equimolar mixture of melamine and cyanuric acid (parts) | L (Å) | UL-94 flame class | Bleed out of flame retardant | Tensile Strength (kg/cm²) |
| --- | --- | --- | --- | --- | --- | --- |
| 1 (example) | water-containing pellets | 6 | 170 | V-0 | o | 760 |
| 2 (example) | water-containing pellets | 10 | 180 | V-0 | o | 780 |
| 3 (example) | water-containing pellets | 15 | 180 | V-0 | o | 750 |
| 4 (comparative example) | dried pellets | 6 | 170 | V-2 | x | 720 |
| 5 (comparative example) | dried pellets | 10 | 180 | V-0 | x | 730 |
| 6 (comparative example) | dried pellets | 15 | 200 | V-0 | x | 710 |

EXAMPLE 9

100 parts of nylon 6, having a $n_r$ of 2.70, a premixed equimolar mixture of melamine and cyanuric acid and water in the amounts shown in Table 8, were uniformly blended using a Henschell mixer, and then fed to a twin screw extruder, TEM 50 produced by TOSHIBA KIKAI CO. LTD., melt-blended at a temperature of 270° C., extruded to a gut and cut to form pellets. After drying these pellets at 80° C. for 16 hours in a vacuum, the test specimens were formed and subjected to testing in the same way as described in example 1.

The results are summarized in Table 8.

Further, by x-ray diffraction analysis of each test specimen, the peaks of melamine and cyanuric acid were not observed and only the peak of melamine cyanurate was present in samples 9-2 through 9-9. But, in sample 9-1, peaks of melamine cyanurate, melamine and cyanuric acid were observed.

TABLE 8

| No. | Amount added (%) Equimolar mixture of melamine and cyanuric acid | Water | L (Å) | Flammability | | | | | Tensile Strength (kg/cm²) | Izod Impact Strength (kg cm/cm) |
| --- | --- | --- | --- | --- | --- | --- | --- | --- | --- | --- |
| 9-1 | 7 | 0 | 160 | 3 (x) | 1 (o) | 3 (x) | 2 (o) | 0 (o) | 810 | 4.0 |
| 9-2 | 7 | 1 | 150 | 2 (o) | 1 (o) | 1 (o) | 0 (o) | 2 (o) | 830 | 4.5 |
| 9-3 | 7 | 5 | 140 | 1 (o) | 0 (o) | 0 (o) | 0 (o) | 1 (o) | 850 | 4.6 |
| 9-4 | 15 | 5 | 150 | 0 (o) | 0 (o) | 0 (o) | 0 (o) | 0 (o) | 870 | 4.3 |
| 9-5 | 15 | 10 | 150 | 0 (o) | 0 (o) | 0 (o) | 0 (o) | 0 (o) | 870 | 4.3 |
| 9-6 | 15 | 15 | 150 | 0 (o) | 0 (o) | 0 (o) | 0 (o) | 0 (o) | 870 | 4.2 |
| 9-7 | 30 | 15 | 200 | 0 (o) | 0 (o) | 0 (o) | 0 (o) | 0 (o) | 880 | 4.0 |
| 9-8 | 30 | 30 | 250 | 0 (o) | 0 (o) | 0 (o) | 0 (o) | 0 (o) | 880 | 4.0 |
| 9-9*1 | 35 | 30 | 250 | 0 (o) | 0 (o) | 0 (o) | 0 (o) | 0 (o) | 870 | 4.0 |

*1 difficult to withdraw the gut because of foaming

What we claim is:

1. A method for preparing a flame retardant polyamide molding resin, containing melamine cyanurate as a flame retardant agent, which comprises separately melt-blending melamine and cyanuric acid with the polyamide, melt-blending both polyamide blends with each other in such an amount that the amounts of melamine and cyanuric acid are equimolar in the ultimate blend of the polyamide molding resin, and thereby converting melamine and cyanuric acid to melamine cyanurate at a conversion of substantially 100%.

2. A method for preparing a flame retardant polyamide molding resin, containing melamine cyanurate as a flame retardant agent, which comprises melt-blending one component selected from the group consisting of melamine ad cyanuric acid with the polyamide to prepare a polyamide blend, having finely dispersed therein said one component, melt-blending the remaining component with the blend so that the amounts of melamine and cyanuric acid are equimolar in the ultimate blend of the polyamide molding resin, and thereby converting melamine and cyanuric acid to melamine cyanurate at a conversion of substantially 100%.

3. A method for preparing a flame retardant polyamide molding resin containing melamine cyanurate as a flame retardant agent which comprises melt-blending melamine, cyanuric acid and a polyamide in the presence of water, 1 to 30% by weight based on the weight of polyamide.

4. A method for preparing a flame retardant polyamide molding resin according to claim 3, wherein the amount of water is 3 to 20% by weight based on the weight of polyamide.

* * * * *

UNITED STATES PATENT AND TRADEMARK OFFICE
CERTIFICATE OF CORRECTION

PATENT NO. : 4,363,890
DATED : December 14, 1982
INVENTOR(S) : Ohshita et al

It is certified that error appears in the above-identified patent and that said Letters Patent is hereby corrected as shown below:

Column 2, line 51, delete "sepecimens" and insert --specimens--

Column 4, line 34, delete "first pellets" and insert --pellets first--

Column 6, line 18, delete "thereafer" and insert --thereafter-- line 47, delete "by"

line 66, delete "specimens" and insert --specimen--

Column 7, line 65, delete "opectra" and insert --spectra--

Column 8, line 52, after "properties" delete the comma

Column 11, line 3, "6310" to read -- 6810 --.

Signed and Sealed this

Twenty-second Day of May 1984

[SEAL]

Attest:

GERALD J. MOSSINGHOFF

Attesting Officer      Commissioner of Patents and Trademarks